(12) United States Patent
Hetzer et al.

(10) Patent No.: US 8,040,692 B2
(45) Date of Patent: Oct. 18, 2011

(54) ASSEMBLY DEVICE FOR LINE AND PLUG CONNECTOR ELEMENTS

(75) Inventors: Ulrich Hetzer, Berlin (DE); Frank Moβner, Berlin (DE); Ferenc Nad, Berlin (DE)

(73) Assignee: ADC GmbH, Berlin (DE)

( * ) Notice: Subject to any disclaimer, the term of this patent is extended or adjusted under 35 U.S.C. 154(b) by 389 days.

(21) Appl. No.: 12/063,985

(22) PCT Filed: Aug. 4, 2006

(86) PCT No.: PCT/EP2006/007729
§ 371 (c)(1),
(2), (4) Date: Aug. 19, 2008

(87) PCT Pub. No.: WO2007/019973
PCT Pub. Date: Feb. 22, 2007

(65) Prior Publication Data
US 2009/0147495 A1    Jun. 11, 2009

(30) Foreign Application Priority Data

Aug. 16, 2005  (DE) .......................... 10 2005 038 540

(51) Int. Cl.
*H02B 1/01* (2006.01)
(52) U.S. Cl. ....................................... 361/825; 361/810
(58) Field of Classification Search .......... 361/825–826, 361/807–810
See application file for complete search history.

(56) References Cited

U.S. PATENT DOCUMENTS

| 5,575,665 | A  | * | 11/1996 | Shramawick et al. | ......... 439/49 |
| 5,743,497 | A  | * | 4/1998  | Michael           | ....... 248/68.1 |
| 5,773,763 | A  |   | 6/1998  | Stachulla         |                  |
| 6,077,113 | A  |   | 6/2000  | Lecomte           |                  |
| 6,347,715 | B1 | * | 2/2002  | Drozdenko et al.  | ........... 211/26 |
| 6,600,106 | B2 | * | 7/2003  | Standish et al.   | ........ 174/68.3 |
| 7,074,080 | B1 | * | 7/2006  | Khemakhem et al.  | ....... 439/578 |
| 7,091,418 | B1 | * | 8/2006  | Clark et al.      | ........ 174/72 A |
| 7,311,550 | B2 |   | 12/2007 | Hammond, Jr. et al. |               |
| 7,510,421 | B2 | * | 3/2009  | Fransen et al.    | ............ 439/449 |
| 7,607,938 | B2 | * | 10/2009 | Clark et al.      | ........... 439/540.1 |
| 2006/0291144 | A1 |   | 12/2006 | Verding         |                  |

FOREIGN PATENT DOCUMENTS

| DE | 94 21 696   | 7/1996  |
| DE | 100 19 452  | 10/2001 |
| DE | 103 13 358  | 8/2004  |
| EP | 0 743 706   | 11/1996 |
| EP | 0 795 935   | 9/1997  |
| EP | 1 280 363   | 1/2003  |
| FR | 2 758 660   | 7/1998  |
| GB | 2 408 392   | 5/2005  |

* cited by examiner

*Primary Examiner* — Hung S Bui
(74) *Attorney, Agent, or Firm* — Merchant & Gould P.C.

(57) ABSTRACT

The invention relates to a mounting apparatus for electrical line and plug-in connecting elements for telecommunications and data technology, having at least one front panel (5), which has a supporting structure (12) with side supporting elements (14) and at least one panel (11) with a plurality of receptacles (10) for connecting sockets, with the front panel (5) being formed completely from plastic.

13 Claims, 10 Drawing Sheets

ASSEMBLY DEVICE FOR LINE AND PLUG CONNECTOR ELEMENTS

Figure 1:
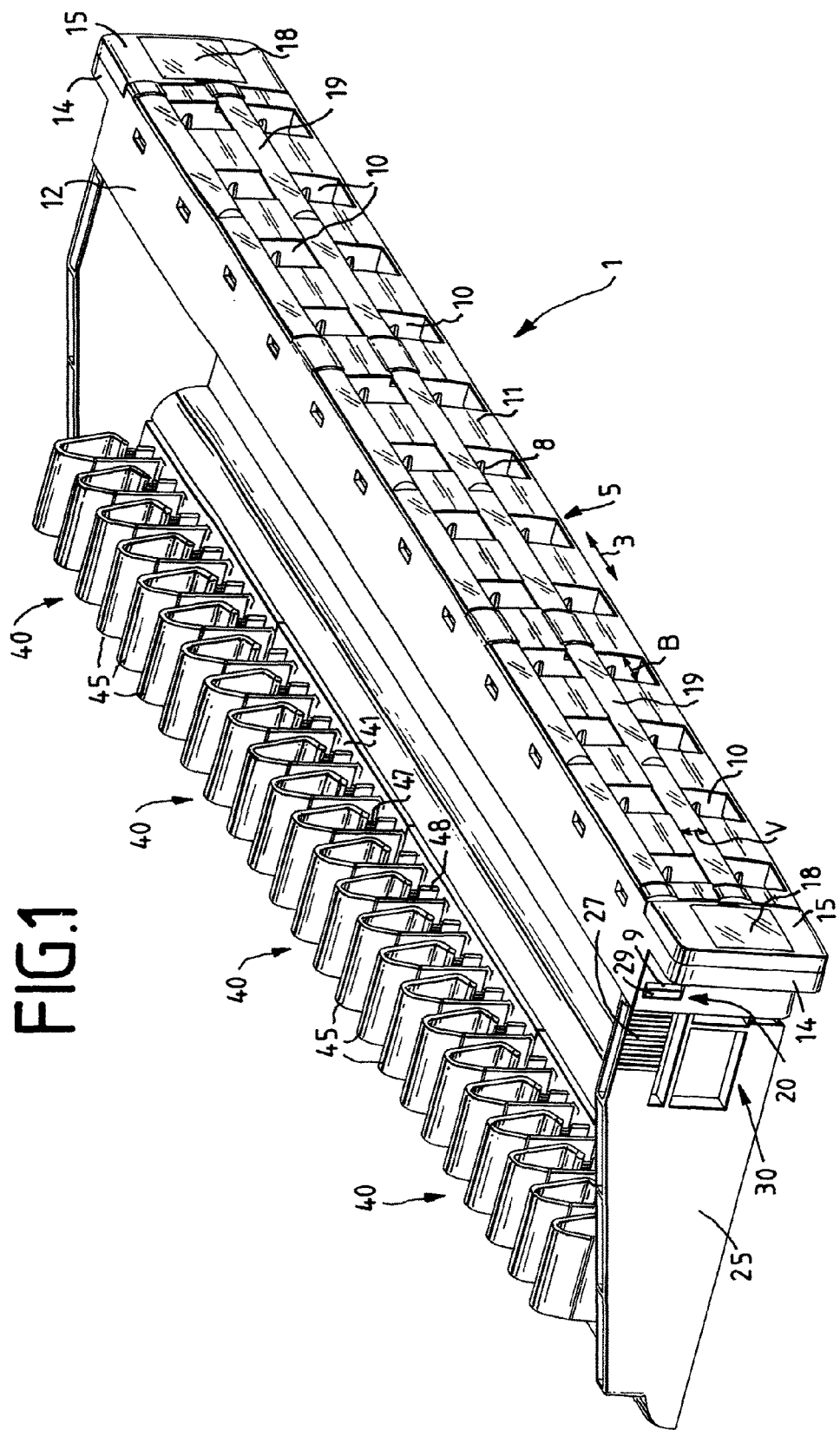

The invention relates to a mounting apparatus for electrical line and plug-in connecting elements for telecommunications and data technology (Patch-Panel).

Mounting apparatuses for line and plug-in connecting elements, so-called patch panels, are known from telecommunications and data technology, with whose aid, for example, a connecting panel is created for data lines. Thus, in particular, patch panels are known which normally have a supporting structure composed of metal as well as one or more panels which can be latched onto the supporting structure and are composed of plastic, and in which receptacles are provided for electrical connecting sockets, with side supporting elements creating the capability for attachment of the mounting apparatus to a switching cabinet or rack, which is normally of the standard 19 inch size. Shielded and unshielded plug connectors are in use. Particularly in the case of unshielded systems for relatively high transmission rates above 10 Gbit, undefinable crosstalk (ANEXT=Alien Near End Cross Talk) occurs between the plug connectors. The invention thus relates to the technical problem of providing a mounting apparatus for electrical line and plug-in connecting elements with improved electrical transmission characteristics, by means of which it is possible, in particular, to comply with the requirements for 10 Gigabit/s-Ethernet.

The invention is in this case based on the knowledge that the metal supporting structure can lead to conductive and inductive couplings which increase the ANNEXT and to be precise with respect to the plug connections and with respect to the unshielded cables lying on metal parts. This effect is detectable even with shielded applications. In contrast to the conventional assumption that metallic shielding of the mounting apparatus contributes to the signal quality, the object is thus achieved according to the invention by entirely dispensing with metallic components in the mounting apparatus. For this purpose, a mounting apparatus for electrical line and plug-in connecting elements for telecommunications and data technology is proposed, having at least one front panel which has a supporting structure with side supporting elements and at least one panel with a plurality of receptacles for connecting sockets, with the front panel being formed completely from plastic. In this case, the expression "plastic" means exclusively an electrically insulating material. This makes use of the knowledge that, as the transmission speeds increase this results not only in the known crosstalk effects within a connecting socket such as NEXT (Near End Cross Talk) and FEXT (Far End Cross Talk) but also in increased influence of the so-called ANEXT (Alien Near End Cross Talk) in the case of adjacent sockets. The higher the signal transmission rate, the greater is the ANEXT influence which the design has to counter. It is thus possible to achieve a reduction in the mutual capacitive and conductive signal injection into adjacent connecting sockets by removing the metal supporting structure of the panel. This offers considerable advantages in particular for novel applications in the 10 Gigabit/s range, since ANEXT has a particularly negative effect in this case.

In one advantageous embodiment, the distance between adjacent receptacles for connecting sockets is in each case at least as great as the width of an individual receptacle. Increasing the distances between adjacent connecting sockets in comparison to the distances that are used in conventional patch panels further reduces the crosstalk caused by ANEXT between adjacent connecting sockets and thus improves the signal quality, since this increases the distance between the interference source and the sink. In this case, it can be assumed that all of the connecting-socket receptacles which are provided on the mounting apparatus have the same width, for example for being able to hold connecting sockets which are a component of plug connections based on the RJ standard. The distance between adjacent receptacles is in this case for example preferably at least 1.4 times the width of the individual receptacle. In this case, the expression "distance between adjacent receptacles" means in particular the lateral distance. If a plurality of rows of receptacles for connecting sockets are provided one above the other in a mounting apparatus, then the crosstalk between the connecting sockets which are located one above the other in different rows is less critical, so that the standard distances are generally sufficient there. Where there are a plurality of rows of receptacles for connecting sockets located one above the other, the lateral distance between adjacent connecting sockets is preferably at least twice and, furthermore, preferably at least 2.5 times the vertical distance between two rows of receptacles which are located one above the other. The receptacles for connecting sockets are preferably arranged at equidistant intervals, so that, for plug connections based on the RJ standard for conventional 19-inch racks, 24 receptacles can preferably be arranged in two rows located one above the other in the front panel, that it is to say preferably 12 receptacles located alongside one another in each row, while complying with the separations according to the invention.

In a further advantageous embodiment, the mounting apparatus has at least one cable holding element composed of plastic for supporting and/or attachment of at least one cable, with the cable holding element being fitted to the rear face of the front panel. The connecting sockets, to which cables have already been fitted, can thus first of all be held in the front panel, in which case the cable can then be passed individually out of the front panel to the rear in a defined position and in a simple and clear manner, by resting on the cable holding element. In this case, it is also feasible for each individual cable to be fixed to the cable holding element, for example by means of a cable tie, which then also provides strain relief. In this case as well, the fact that the cable holding element is manufactured as a plastic part reduces capacitive-conductive couplings and undesirable crosstalk resulting from this.

In a further advantageous embodiment, the cable holding element is attached to the front panel by being latched in by means of at least one snap-action connection. This allows the connecting sockets, which have already been wired up, to be mounted easily, quickly and robustly.

In a further advantageous embodiment, in order to fit the cable holding element to the front panel, these engage in one another in places, with at least one hinge being provided in the area of the mutual engagement, with whose aid the cable holding element can be pivoted with respect to the front panel. The connecting sockets can thus be wired up first of all and then inserted in the front panel, before the cable holding element is then hooked into the front panel from underneath by means of the hinge, is folded up, is latched in, and can thus be installed in its entirety. This corresponds to a particularly simple, clean, fast and robust mounting process.

In a further advantageous embodiment, at least one cable holder composed of plastic is provided on the cable holding element for defined positioning of a plurality of cables. In addition to the advantage of increased clarity of the installed cables achieved in this way, the cable holder composed of plastic also serves to prevent electrical contacts between the shields of the individual cables. The embodiment in the form of a plastic part thus in this case also serves to reduce capacitive/conductive couplings between the lines, and undesirable crosstalk caused by this.

In a further advantageous embodiment, the cable holding element and the cable holder are formed integrally. In addition to the advantage of increased robustness, integral manufacture is also generally comparatively cost-effective for storage and production.

In one alternative embodiment, the cable holding element and the cable holder are formed from two or more parts. This makes it possible to use different cable holders as required, for example for different cable thicknesses, and to replace them in a simple manner. A plurality of cable holders, for example four, are preferably used over the entire width of the cable holding element. This makes it possible on the one hand to use different cable holders as required for different cable thicknesses within a single mounting apparatus, while on the other hand keeping the manufacturing effect and costs low, since smaller and narrower cable holders can be manufactured more easily and at a lower cost than corresponding larger units.

In a further advantageous embodiment, a plurality of curved holding elements are provided on the cable holder, are arranged alongside one another, are open on one side and are designed to be resiliently elastic for defined positioning and/or attachment of in each case at least one cable to the cable holder. In this case, the holding elements are likewise formed from plastic, as components of the cable holder. The curved design in this case makes it easier to insert the cables into the intermediate spaces between the holding elements in the cable holder, and automatically leads to the cables being positioned correctly, with an adequate separation. The resilient elastic form of the curved elements and of their opening on one side results in the installed cables being held both in an interlocking manner and with a force fit in their position on the respective cable holder.

Figure 2:
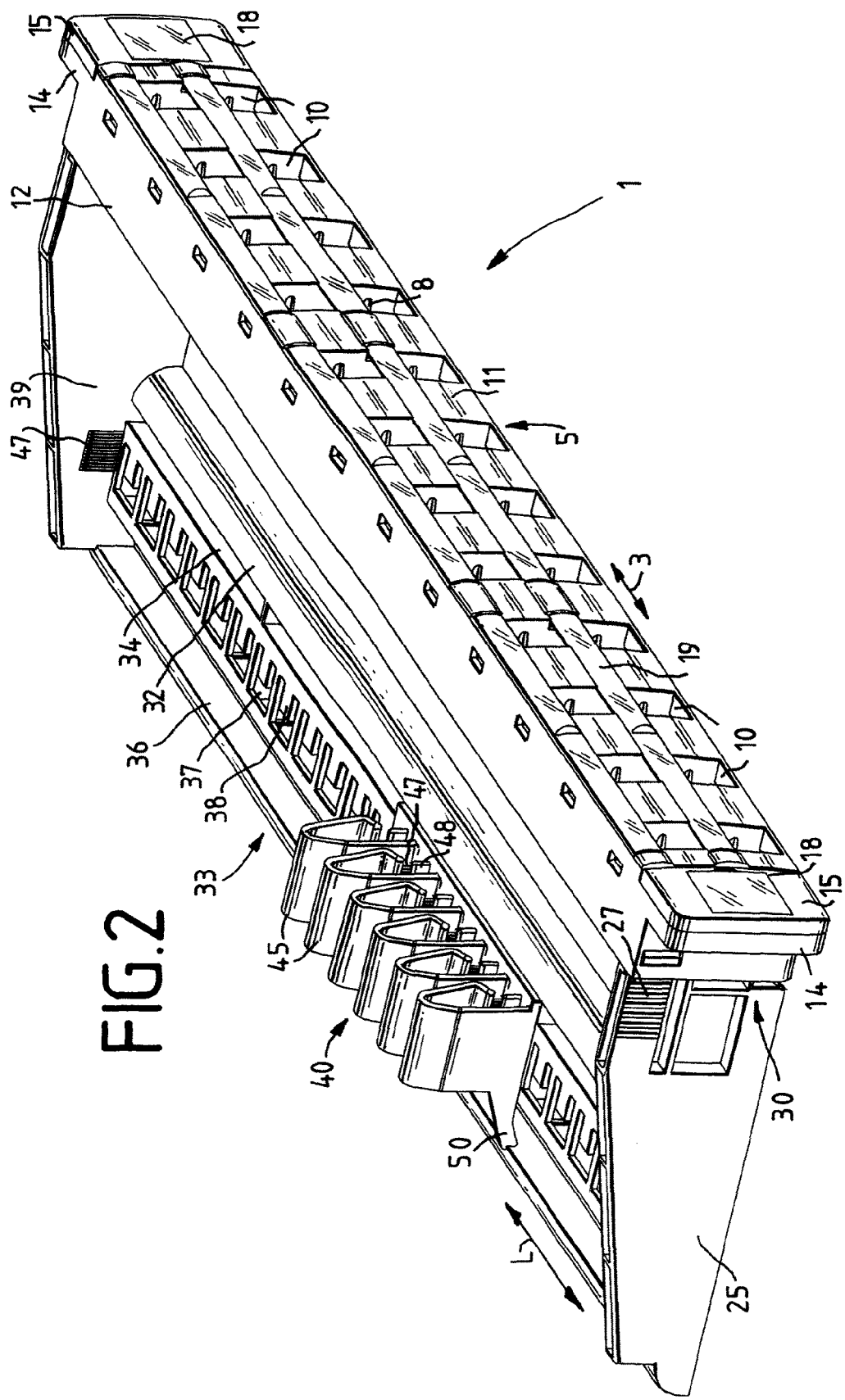
Figure 3:
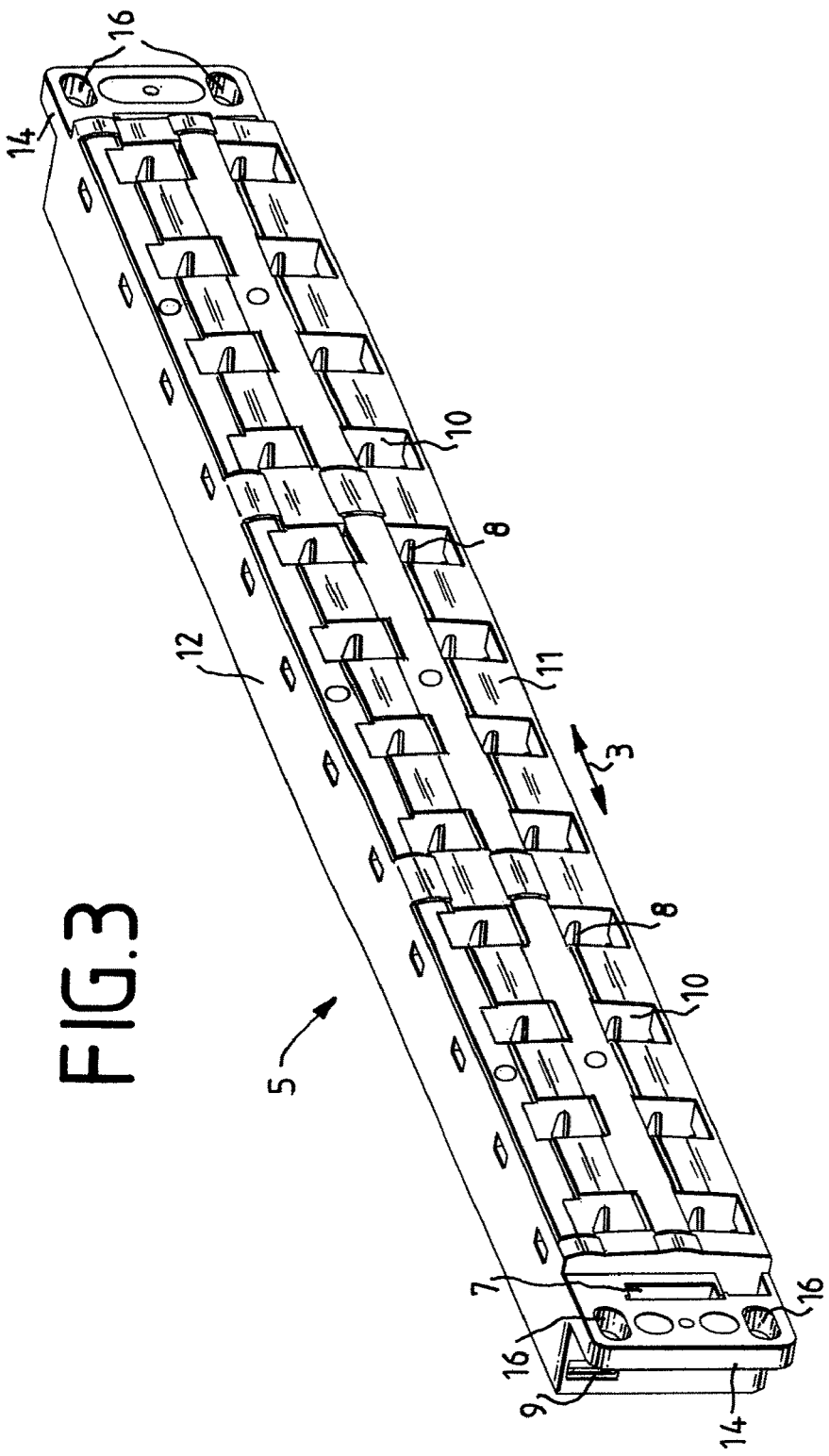
Figure 4:
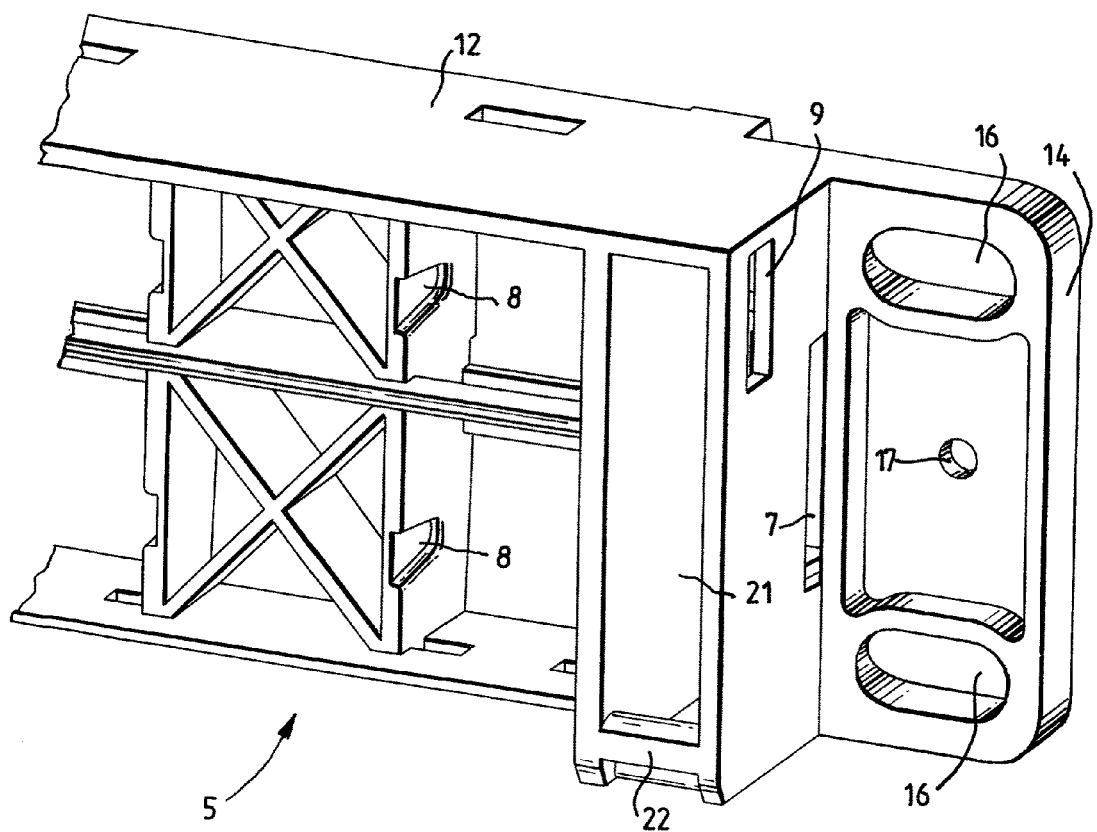
Figure 5:
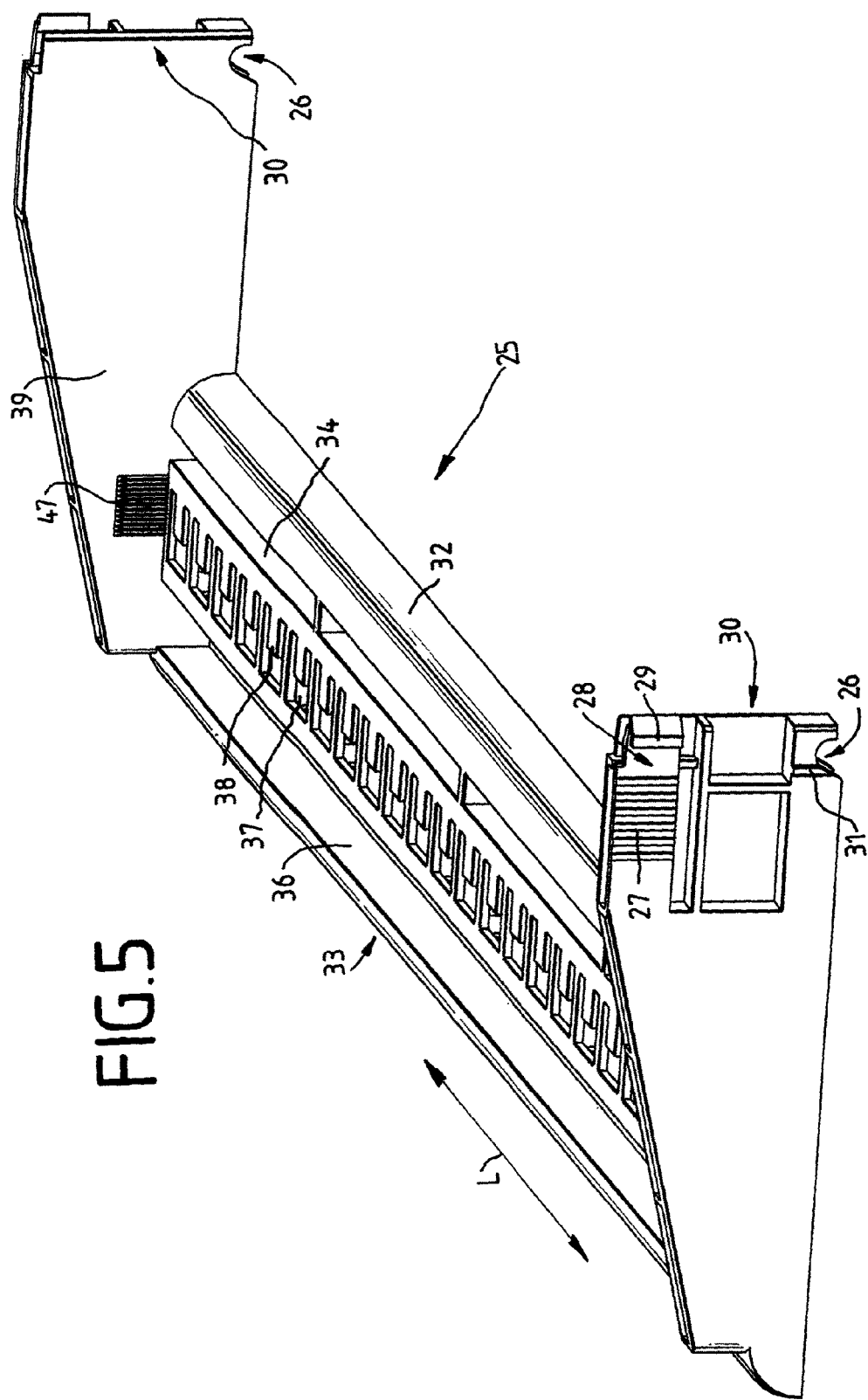
Figure 6:
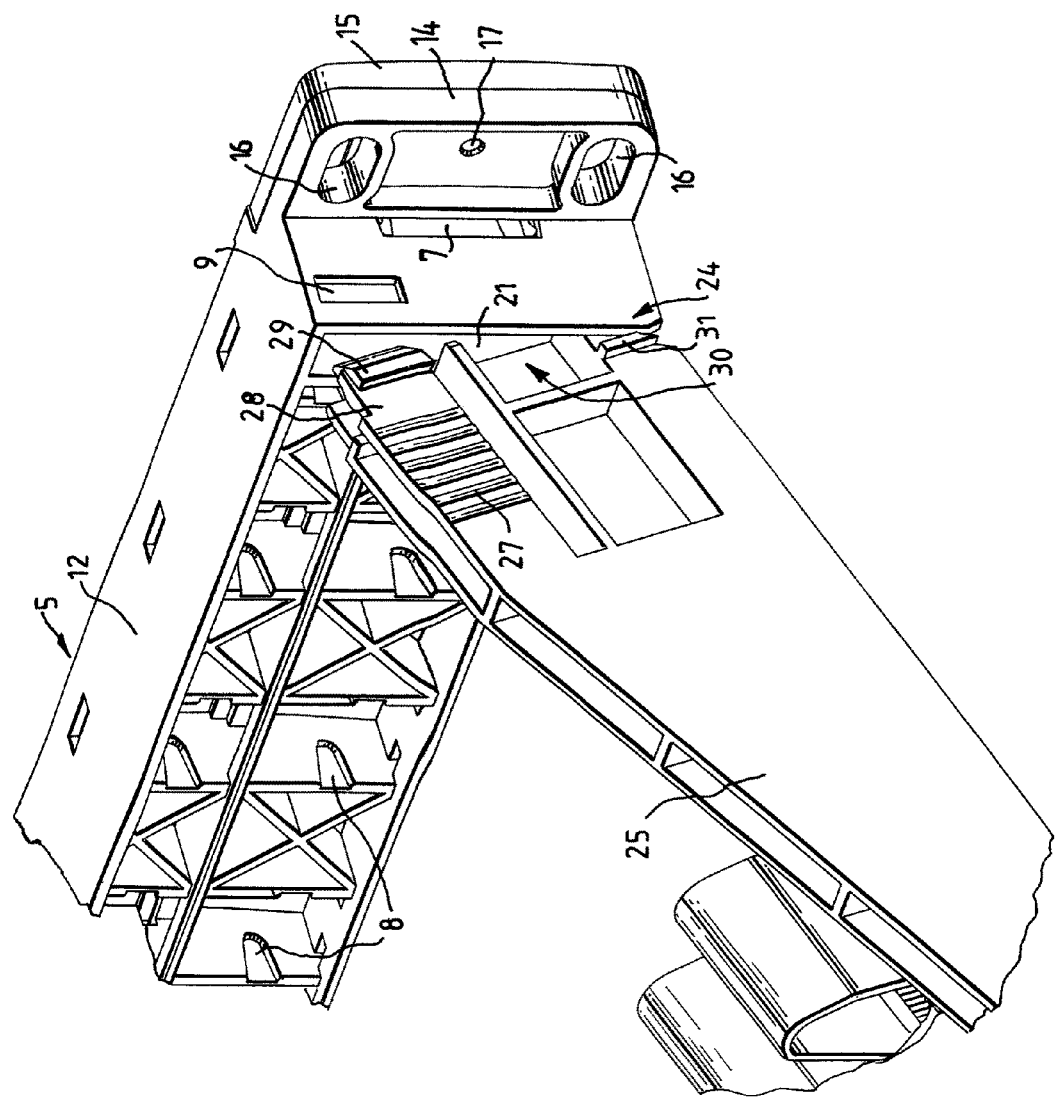
Figure 7:
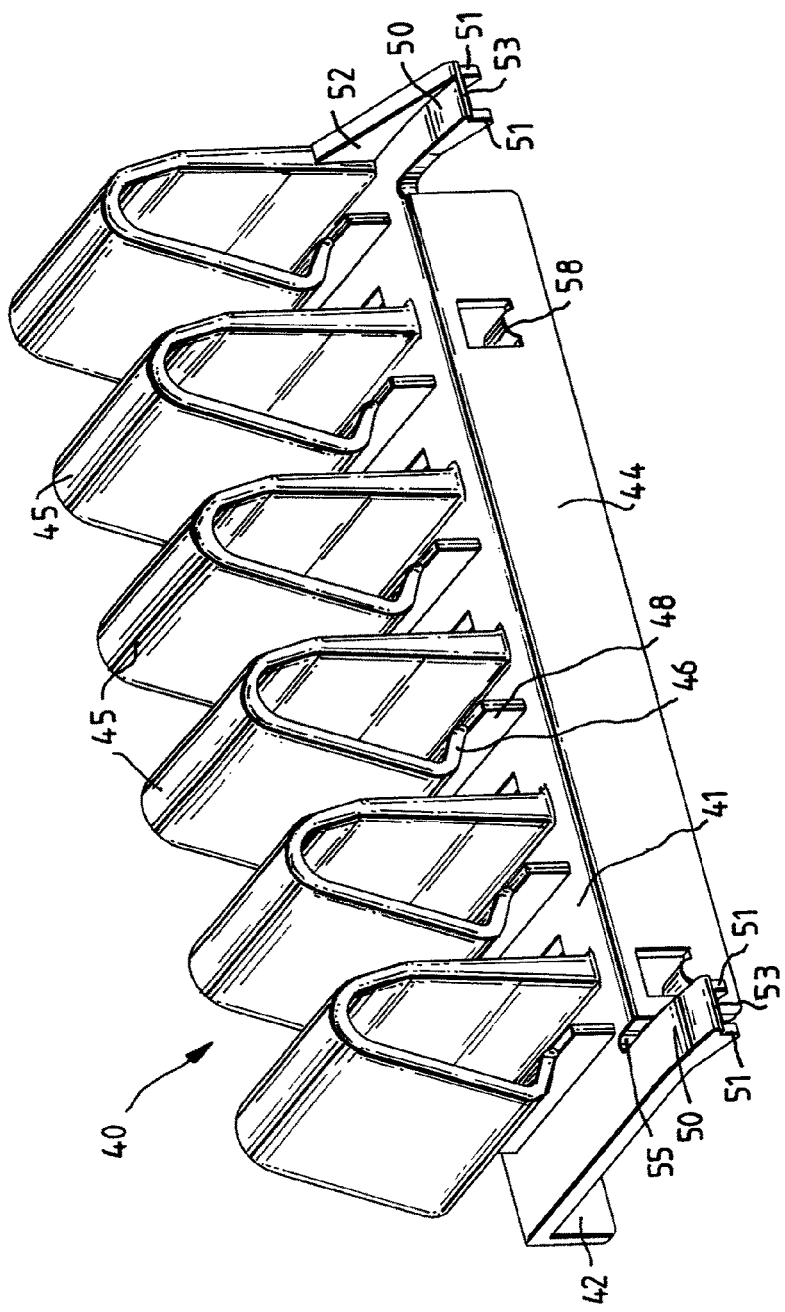
Figure 8:
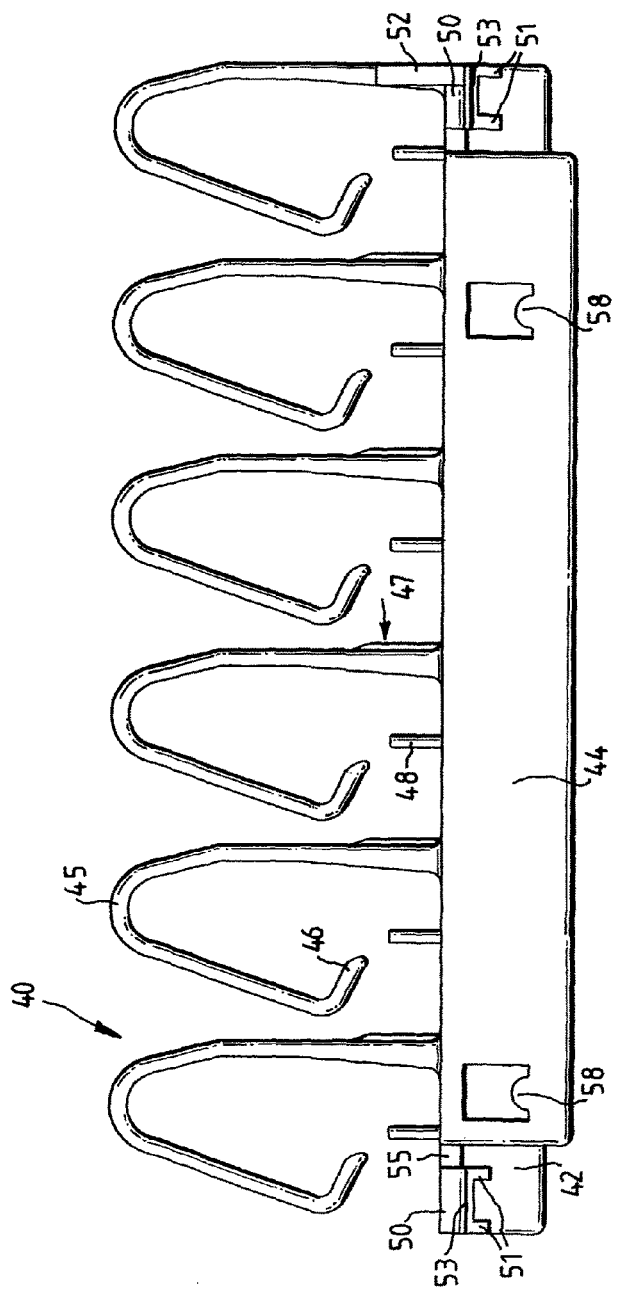
Figure 9:
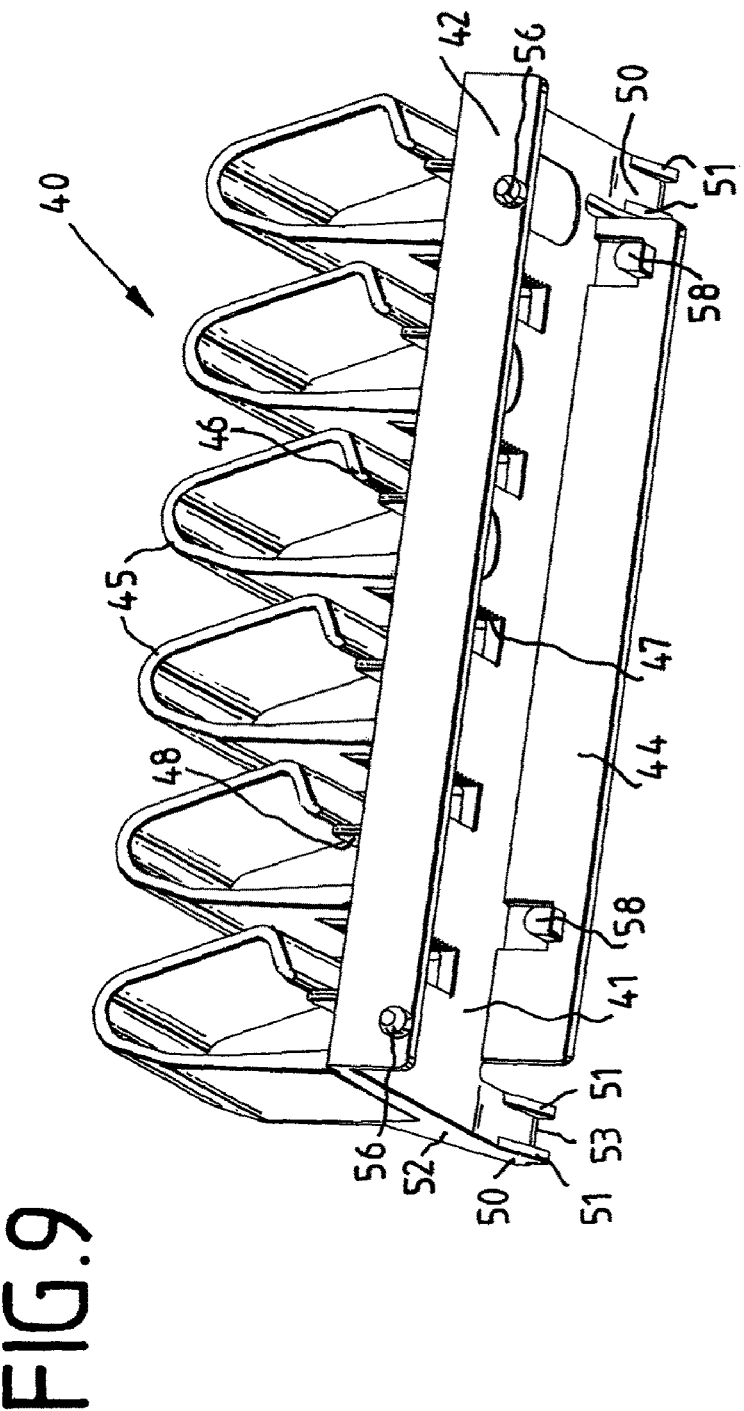
Figure 10:
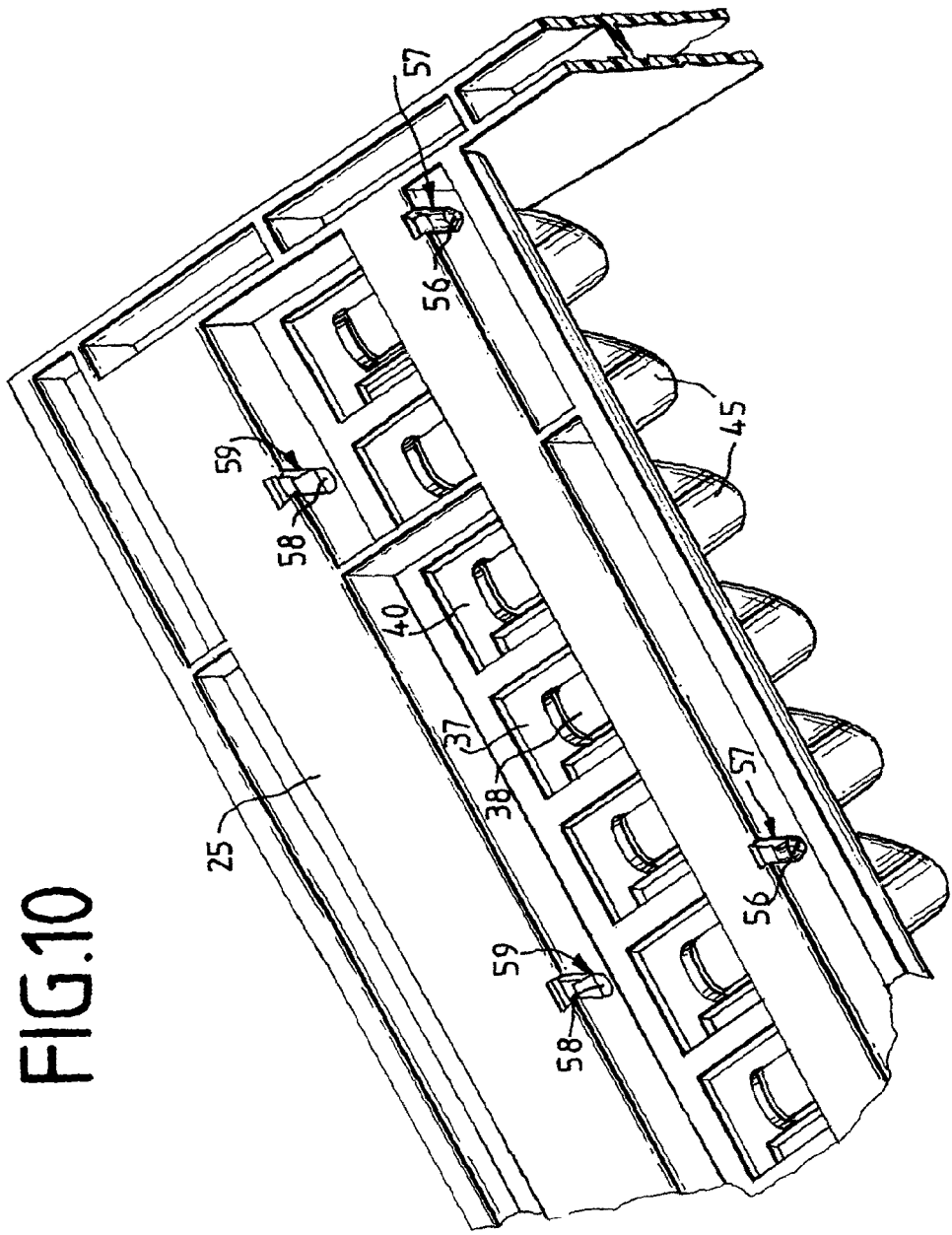

The invention will be explained in more detail in the following text with reference to one preferred exemplary embodiment. In the associated drawings:

FIG. 1 shows a perspective view of a mounting apparatus according to the invention for line and plug-in connecting elements, seen frontally obliquely from above, FIG. 2 shows a perspective view of one variant of the same embodiment of a mounting apparatus according to the invention for line and plug-in connecting elements, seen frontally obliquely from above, FIG. 3 shows a perspective view of a front panel of a mounting apparatus according to the invention, seen frontally obliquely from above, FIG. 4 shows a perspective detailed view of a side section of the rear face of a front panel of a mounting apparatus according to the invention, seen obliquely from underneath, FIG. 5 shows a perspective view of a cable holding element of a mounting apparatus according to the invention, seen obliquely from above, FIG. 6 shows a perspective detailed view of the latching-in process between a front panel and a cable holding element of a mounting apparatus according to the invention, seen obliquely from underneath, FIG. 7 shows a perspective view of a cable holder of a mounting apparatus according to the invention, seen frontally obliquely from above, FIG. 8 shows a front view of a cable holder of a mounting apparatus according to the invention, FIG. 9 shows a perspective view of a cable holder of a mounting apparatus according to the invention, seen frontally obliquely from underneath, and FIG. 10 shows a perspective detailed view of a cable holder, latched into a cable holding element, of a mounting apparatus according to the invention, seen obliquely from underneath.

FIG. 1 shows, seen frontally obliquely from above, a perspective view of a mounting apparatus according to the invention for line and plug-in connecting elements for telecommunications and data technology, a so-called patch panel 1, with whose aid, for example, a connecting panel can be created for data lines. The patch panel 1 in this case has a front panel 5 which has a supporting structure 12 with side supporting elements 14 as well as a panel 11, which is formed integrally with the front panel 5 and has a plurality of receptacles 10 for connecting sockets (not illustrated), with the front panel 5 being formed completely from plastic. The omission of all the metal parts thus makes it possible to reduce the mutual capacitive and conductive signal injection into adjacent connecting sockets in order, in particular, to as far as possible prevent the crosstalk caused by "Alien Near End Cross Talk" (ANEXT). The receptacles 10 for connecting sockets are arranged in two rows, located one above the other, in the front panel 5. The lateral distance 3 between adjacent receptacles 10 for connecting sockets is in this case in each case at least as great as the width B of a single receptacle 10. The distance between adjacent receptacles 10 is in this case preferably, for example, at least 1.4 times the width of an individual receptacle 10. The lateral distance between adjacent receptacles 10 for connecting sockets is, furthermore, preferably at least twice and furthermore preferably at least 2.5 times the vertical distance V between two rows of receptacles 10 located one above the other. All of the receptacles 10 which are provided on the front panel 5 for connecting sockets in this case have the same width B, for example to allow accommodation of connecting sockets which are a component of plug connections based on the RJ standard, in particular RJ45 sockets. For this purpose, an anchoring groove 8 for connecting sockets that are to be fitted is in each case provided on the left and right on the inside of each receptacle 10. The receptacles 10 for connecting sockets are arranged at equidistant intervals, so that twenty four receptacles are arranged in the front panel 5, in two rows located one above the other, that is to say 12 receptacles located alongside one another in each row, for plug connections based on the RJ standard for conventional 19-inch racks, while complying with the separations according to the invention. The side supporting elements 14 which are provided at the left and right-hand ends of the front panel 5 allow the patch panel 1 to be attached to a switching cabinet or rack which is normally of the standard 19-inch size. A side cover element 15, which can be latched on, is provided on each of the side supporting elements 14 and, on its front face, in each case has a square trough in each of which an inscription field is arranged, and is covered by a transparent label cover 18 that is formed, for example, from polyacryl. The panel 11 is subdivided in the longitudinal direction into three sections of equal width and equal height. In this case, an elongated inscription field is in each case arranged in each of the sections above the two rows of receptacles 10 which are arranged one above the other for connecting sockets, and is in each case covered by a transparent elastic label cover 19. Each of the inscription fields which are covered by the elastic label cover 19 in this case extends in its longitudinal direction over the width of four receptacles 10 for connecting sockets, as well as three distances 3 between them. The front panel 5 and the panel 11 are admittedly preferably formed integrally, but it is also feasible for them to be formed as separate components and from two or more parts. For example, the panel 11 can thus—corresponding to its subdivision into three sections—be formed as three separate plug-on parts which can be latched in the front panel 5 and each comprise, for example, two rows, each having four receptacles 10, as well as in each case two inscription fields, each with a transparent elastic label cover 19.

A cable holding element 25 composed of plastic is fitted to the rear face of the front panel 5 in order to support and/or attach one or more cables (not illustrated). In this case, the cable holding element 25 is essentially U-shaped and is attached by the ends of the side limbs of the stylized U to the front panel 5, by being latched in, by means of in each case one snap-action connection 20. The snap-action connection 20 is in this case produced by a latching web 29, which is a component of a snap-action connecting plug-in element 30, engaging in a latching slot 9. In order to make it easier to release the snap-action connection 20, a groove system 27 is applied to an elastic section of the snap-action connecting plug-in element 30.

A total of four preferably identical cable holders 40 composed of plastic are provided on the cable holding element 25, for defined positioning of a plurality of cables (not illustrated), with the cable holding element 25 and the cable holders 40 being formed separately, and the four cable holders 40 extending over virtually the entire width of the cable holding element 25. The cable holders 40 each have a cap 41, on each of which a plurality of curved holding elements 45 (preferably six holding elements 45) are provided, which are arranged alongside one another, are open on one side and are designed to be resiliently elastic for defined positioning and/or attachment of in each case at least one cable to the cable holders 40. As components of the respective cable holder 40, the holding elements 45 are in this case likewise formed from plastic. The curved design in this case makes it easier to insert the cables into the intermediate spaces between the holding elements 45 in the cable holder 40, and automatically leads to correct positioning of the cables with an adequate separation. The resiliently elastic form of the curved holding elements 45 and their opening on one side results in the installed cables being held both in an interlocking and in a force-fitting manner in their position on the respective cable holder 40. In addition to the advantage of increased clarity of the installed cables achieved in this way, the cable holders 40 composed of plastic also serve to prevent electrical contacts between the shields of the individual cables. A positioning web 48, which projects upwards and runs transversely with respect to the longitudinal direction of the cable holder 40, is arranged on the surface of the cap 41 of each of the cable holders 40, underneath each curved holding element 45. This positioning web 48 is used for defined positioning of a cable and prevents it from sliding laterally. Furthermore, a tooth system 47 is in each case applied to the outside of each curved holding element 45 in the transitional area to the cap 41 and is used to engage in the insulation on a cable that is firmly clamped by the respective adjacent curved holding element 45, and to prevent it from sliding in the longitudinal direction.

FIG. 2 shows, seen frontally obliquely from above, a perspective view of one variant of the same embodiment of a mounting apparatus according to the invention for line and plug-in connecting elements for telecommunications and data technology. The illustration in this case likewise shows a patch panel 1, but in this case, in contrast to the mounting apparatus shown in FIG. 1, just one cable holder 40 is fitted to the U-shaped cable holding element 25 instead of four. As can thus be seen, a narrow latching channel 34 as well as a broad latching channel 36 running parallel to it and in which the cable holder 40 can engage are in each case provided in the longitudinal direction L in an elongated transverse section 33 of the cable holding element 25, to which cable holders 40 can be fitted. When in its latched-in state, the cable holder 40 is in this case located, inter alia, on a latching rail 32 which bounds the narrow latching channel 34, and is supported on it. Furthermore, a plurality of cutouts 37, which are arranged alongside one another and into which attachment lugs 38 project, are located in the elongated transverse section 33 of the cable holding element 25, between the narrow latching channel 34 and the broad latching channel 36. The number of cutouts 37 and of attachment lugs 38 preferably corresponds to the number of receptacles 10 arranged in the front panel 5, that is to say twenty four in the present example. The attachment lugs 38 are used for attachment of cables, for example with the aid of cable ties (not illustrated), in particular for those situations in which the cable diameter does not correspond to the size of the cable holder 40, but is too thick or too thin for it, in order to position and to firmly clamp the cable in a satisfactory manner. In this case, the cable holder 40 can be removed, and, instead of this, the relevant cable can be attached to the cable holding element 25 with the aid of a cable tie. As can also be seen a tooth system 47 is likewise provided on one of the two inner surfaces 39 of the cable holding element 25 adjacent to the elongated transverse section 33, in order to provide sufficient retention in the longitudinal direction in addition for a cable which is fitted (not illustrated) between the inner surface 39 and the outermost curved holding element 45 of a cable holder 40 which is adjacent to the inner surface 39.

FIG. 3 shows, seen frontally obliquely from above, a perspective view of the front panel 5, which is illustrated on its own. Since the side cover elements 15 illustrated in FIGS. 1 and 2, the associated label covers 18 and the elastic label covers 19 are omitted in this case, it can be seen that the side supporting elements 14 each have two holes 16, by means of which the front panel 5 or the patch panel 1 (see FIG. 1 and FIG. 2) can be attached to a switching cabinet or rack (not illustrated). The holes 16 are in this case preferably in the form of transversely running elongated holes in order to allow a certain amount of play for lateral position correction during installation in the rack. Furthermore, a vertically running holding slot 7 for accommodation of latching lugs (not illustrated) on the side cover elements 15 which can be latched in (see FIGS. 1 and 2) is provided in each of the side supporting elements 14.

FIG. 4 shows a perspective detailed view of a side section of the rear face of the front panel 5, seen obliquely from underneath. In particular, this shows that the area of the front panel 5 which is adjacent to the side supporting element 14 forms a cavity in order to form the snap-action connection 20 (see FIG. 1), and is in the form of a snap-action connecting receptacle 21. Furthermore, the lower end of the snap-action connecting receptacle 21 is in the form of a hinge pin 22 in order to form a hinge 24 (see FIG. 6). The hinge pin 22 is in this case preferably in the form of a profiled step which runs transversely and is raised above the base surface of the snap-action connecting receptacle 21. However, it is also feasible for the hinge pin 22 to be formed, for example, from a transversely running cylindrical, or half-cylindrical, web. As can also be seen, a centring hole 17 is provided in the side supporting element 14 and is used for exact positioning of the side cover element 15 (see FIGS. 1 and 2) by means of a centring pin (not illustrated), which is fitted to it and can engage in the centring hole 17.

FIG. 5 shows a perspective view of the cable holding element 25, seen obliquely from above. In particular, this shows that the ends of the side limbs of the U-shaped cable holding element 25 are in the form of snap-action connecting plug-in elements 30. At their upper ends, these each have a snap-action lug 28, which can be bent elastically resiliently in the longitudinal direction L of the cable holding element 25, and at the outsides of which the groove system 27 is applied at the sides. The latching web 29 forms the front end of the snap-action lug 28, and is inclined in a wedge shape, in order to simplify the latching-in process. A hinge recess 26 is provided at the lower end of the snap-action connecting plug-in element 30, in order to form the hinge 24. This hinge recess 26 is preferably in the form of a half-cylindrical recess. A stop 31, which is in the form of a profiled web, is provided adjacent to the hinge recess 26.

FIG. 6 shows a perspective detailed view of the latching-in process between the front panel 5 and the cable holding element 25, seen obliquely from underneath. In order to form the snap-action connection 20 (see FIG. 1), the cable holding element 25 and the front panel 5 engage in one another in places, with the hinge 24 being provided in the area in which they engage with one another, and being used to allow the cable holding element 25 to pivot with respect to the front panel 5. In order to carry out the latching-in process, the hinge recess 26 (see FIG. 5) is first of all hooked into the hinge pin 22 (see FIG. 4), and the cable holding element 25 is then pivoted upwards about the hinge 24 with respect to the front panel 5. This results in the snap-action connecting plug-in element 30 being inserted completely into the snap-action connecting receptacle 21, until the stop 31 rests on the rear face of the front panel 5, and the latching web 29, which is in the form of a wedge, is latched into the latching slot 9 at the outer end of the snap-action lug 28. The connecting sockets to be installed can thus first of all be wired up and can then be inserted in the front panel 5, before the cable holding element 25 is then hooked into the front panel 5 from underneath by means of the hinge 24, is folded up, is latched in, and can thus be installed in its entirety in an extremely simple manner. In order to release the snap-action connection 20, the snap-action connecting plug-in element 30 is compressed in the area of the groove system 27, so that the elastically resilient snap-action lug 28 is bent inwards, and the latching web 29 can be disengaged from the latching slot 9. The entire cable holding element 25 can then be pivoted downwards about the hinge 24 with respect to the front panel 5, and the snap-action connecting plug-in element 30 can be disengaged from the snap-action connecting receptacle 21.

FIG. 7 shows a perspective view of the cable holder 40, seen frontally obliquely from above. This shows that starting from its cap 41, the cable holder 40 has a narrow cap rim 42, which projects downwards, as well as a broad cap rim 44 on each of its longitudinal faces, which rims are used to position the cable holder 40 on the cable holding element 25. For this purpose, the narrow cap rim 42 engages in the narrow latching channel 34 and is supported on the latching rail 32, while the broad cap rim 44 engages in the broad latching channel 36 (see FIG. 2). Furthermore, the cable holder 40 has a snap-action hook 50, which projects transversely from the cable holder 40, at each of its two ends of that longitudinal face to which the broad cap rim 44 is fitted. This snap-action hook 50 in each case has two latching webs 51, which are in the form of wedges and project downwards, as well as a transversely running profiled web 53, with whose aid the snap-action hook 50 supports the cable holder 40 on that edge of the broad latching channel 36 which is opposite the cable holder 40. A stabilization web 52 is provided on one of the two snap-action hooks 50 in order to support the cable holder 40 more robustly. Furthermore, two holding pillars 58 which project inwards are preferably provided in the broad cap rim 44 in order to fix the cable holder 40 to the cable holding element 25, and can engage in openings 59 (see FIG. 10), which correspond to them, in the broad latching channel 36 in the cable holding element 25. The holding pillars 58 are preferably in the form of half-cylindrical studs. For the same purpose, two holding pins 56 which project outwards (see FIG. 9) are preferably provided on each narrow cap rim 42, and can engage in openings 57 which correspond to them (see FIG. 10) in the narrow latching channel 34 in the cable holding element 25. In order to disengage the cable holder 40 from the cable holding element 25, the snap-action hook 50 is bent slightly upwards from the supporting position on the broad latching channel 36, so that the cable holder 40 is moved transversely with respect to the narrow and broad latching channels 34, 36, the holding pillars 58 are disengaged from the openings 59, the holding pins 56 are disengaged from the openings 57, and the cable holder 40 can be disengaged from the cable holding element 25. In order to make it easier to flexibly bend the snap-action hook 50, a cutout 55 is provided in each case at the junction between the snap-action hook 50 and the cap 41.

FIG. 8 shows a front view of the same cable holder 40, while FIG. 9 shows a perspective view of the cable holder 40, seen frontally obliquely from underneath. In contrast, FIG. 10 shows the cable holder 40 in the form of a perspective detailed view, seen obliquely from underneath, in the position in which it is latched in the cable holding element 25. This shows in particular how the holding pins 56 and the holding pillars 58 engage in the respect openings 57, 59, which correspond to them, in the narrow and broad latching channels 34, 36.

LIST OF REFERENCES

1 Patch-Panel
3 Distance
5 Front panel
7 Holding slot
8 Anchoring groove
9 Latching slot
10 Receptacle
11 Panel
12 Supporting structure
14 Side supporting element
15 Side cover element
16 Hole
17 Centring hole
18 Label cover
19 Elastic label cover
20 Snap-action connection
21 Snap-action connecting receptacle
22 Hinge pin
24 Hinge
25 Cable holding element
26 Hinge recess
27 Groove system
28 Snap-action lug
29 Latching web
30 Snap-action connecting plug-in element
31 Stop
32 Latching rail
33 Elongated transverse section
34 Narrow latching channel
36 Broad latching channel
37 Cutout
38 Attachment lugs
39 Inner surface
40 Cable holder
41 Cap 42 Narrow cap rim
44 Broad cap rim
45 Curved holding element
46 Hooked end
47 Tooth system
48 Positioning web
50 Snap-action hook
51 Latching web
52 Stabilization web
53 Profiled web
55 Cutout
56 Holding pin
57 Opening
58 Holding pillar
59 Opening
B Width of the receptacle
V Vertical distance between the receptacles
L Longitudinal direction of the cable holding element

The invention claimed is:

1. A mounting apparatus for electrical line and plug-in connecting elements for telecommunications and data technology, the mounting apparatus comprising:
   at least one front panel including a front face, a supporting structure that extends rearwardly from the front face, and side supporting elements that are configured to couple the front panel to a frame, the front panel defining a plurality of receptacles for connecting sockets positioned in an upper row and a lower row, wherein the front panel is formed completely from plastic;
   wherein a distance between each adjacent pair of receptacles in each row is at least as great as a width of each individual receptacle of the pair, and wherein the receptacles of the upper row align with the receptacles of the lower row.

2. The mounting apparatus as claimed in claim 1, further comprising at least one cable holding element composed of plastic for supporting at least one cable, the cable holding element being fitted to a rear face of the front panel.

3. The mounting apparatus as claimed in claim 2, wherein the cable holding element is attached to the front panel by being latched in at least one snap-action connection.

4. The mounting apparatus as claimed in claim 2, wherein the cable holding element and the front panel engage one another in an area of mutual engagement, wherein at least one hinge is provided in the area of the mutual engagement, wherein the cable holding element is configured to be pivoted about the hinge with respect to the front panel.

5. The mounting apparatus as claimed in claim 2, wherein at least one cable holder composed of plastic is provided on the cable holding element to form defined positioning of a plurality of cables.

6. The mounting apparatus as claimed in claim 5, wherein the cable holding element and the cable holder are formed integrally.

7. The mounting apparatus as claimed in claim 5, wherein the cable holding element and the cable holder are formed from two or more parts.

8. The mounting apparatus as claimed in claim 5, wherein a plurality of curved holding elements are provided on the cable holder.

9. The mounting apparatus as claimed in claim 8, wherein the curved holding elements are arranged alongside one another on the cable holder.

10. The mounting apparatus as claimed in claim 8, wherein each of the curved holding elements is open on one side.

11. The mounting apparatus as claimed in claim 8, wherein each of the curved holding elements is designed to be resiliently elastic to enable defined positioning of at least one cable to the cable holder.

12. The mounting apparatus as claimed in claim 8, wherein each of the curved holding elements is configured to attach at least one of the cables to the cable holder.

13. The mounting apparatus as claimed in claim 2, wherein the at least one cable holding element is configured to attach the cable to the mounting apparatus.

* * * * *